United States Patent Office.

JOSEPH P. BALL, OF LEBANON, INDIANA.

Letters Patent No. 79,098, dated June 23, 1868.

IMPROVED MEDICINE FOR HOG-CHOLERA.

The Schedule referred to in these Letters Patent and making part of the same.

TO ALL WHOM IT MAY CONCERN:

Be it known that I, JOSEPH P. BALL, of the town of Lebanon, in the county of Boone, and State of Indiana, have invented and discovered a new and improved Medicine for the Prevention and Cure of Hog-Cholera; and I do hereby declare that the following is a full and exact description thereof, reference being had to the accompanying words and figures, and name and description of the materials and substances, and their proportions, in said medicine.

The nature of my invention consists of the new compound, and the proper proportions of the materials and substances hereinafter named, and the quantity to be administered, to effect a prevention or cure of said disease.

To enable others skilled in the art to make and properly use and administer the medicine by me invented, I will proceed to describe the materials and substances, and the proper proportionate parts thereof, and how the same are compounded, mixed, and prepared, and administered to prevent the disease of hog-cholera, and to effect a cure thereof.

The materials and substances, of the proportionate parts of each of which I prepare said medicine, are the following-named, to wit: Rosin, saltpetre, sulphur, ginger, bayberry, cayenne pepper, galls, flax-seed, gentian, cream of tartar, and anise-seed, being eleven substances, found in *Materia Medica;* and the method of compounding the proportionate parts used, and the manner of using and administering the same, are herewith given, and what quantity shall be administered to prevent or to effect a cure of said disease of hog-cholera.

The materials of which the aforesaid medicine is composed, and the proportionate parts of each, are as follows, namely:

Rosin, ten pounds.
Sulphur, ten pounds.
Saltpetre, ten pounds.
Ginger, ten pounds.
Bayberry, four pounds.
African cayenne, four pounds.
Galls, one pound.
Flax-seed, ten pounds.
Gentian, ten pounds.
Cream tartar, ten pounds.
Anise-seed, one pound.

The above are proper proportions of each material. For making a greater or a less quantity of the medicine, use the same proportionate parts, all of which should be pulverized, and thoroughly mixed together before used; the same to be given to hogs in the following proportions and manner, say, from a half to a tablespoonful to each, every three hours, in bran-mash, or any other feed; and for prevention of the disease, one-quarter of a pound to half a barrel of swill, or other feed.

What I claim as my invention and discovery, and desire to secure by Letters Patent, is—

The improved and newly-discovered medicine, for the cure and prevention of hog-cholera, compounded and prepared of the materials and substances in the manner and proportions, and administered as herein set forth.

JOSEPH P. BALL.

Witnesses:
JOHN H. HENDRICKS,
HENRY VANNIS.